United States Patent
Zur

(10) Patent No.: US 10,939,390 B2
(45) Date of Patent: Mar. 2, 2021

(54) TECHNOLOGIES FOR ONLINE GAIN LINEUP IN MILLIMETER WAVE TRANSCEIVERS

(71) Applicant: Intel Corporation, Santa Clara, CA (US)

(72) Inventor: Sarit Zur, Petah-Tikva (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/457,061

(22) Filed: Jun. 28, 2019

(65) Prior Publication Data

US 2019/0327694 A1    Oct. 24, 2019

(51) Int. Cl.
*H04W 52/38* (2009.01)
*H04W 52/10* (2009.01)
*H04W 52/24* (2009.01)

(52) U.S. Cl.
CPC .......... *H04W 52/38* (2013.01); *H04W 52/10* (2013.01); *H04W 52/243* (2013.01)

(58) Field of Classification Search
CPC .. H04B 17/102; H04W 52/10; H04W 52/243; H04W 52/38
See application file for complete search history.

(56) References Cited

U.S. PATENT DOCUMENTS

| | | | |
|---|---|---|---|
| 2002/0119797 A1* | 8/2002 | Woodhead | H04W 52/362 455/522 |
| 2005/0140436 A1* | 6/2005 | Ichitsubo | H01L 23/66 330/129 |
| 2006/0160503 A1* | 7/2006 | Ichitsubo | H03F 3/195 455/127.1 |
| 2011/0053547 A1* | 3/2011 | Yahav | H03D 7/00 455/317 |
| 2015/0171854 A1* | 6/2015 | Yoshimoto | H03K 17/14 327/540 |
| 2016/0344393 A1* | 11/2016 | Kawano | G01S 7/352 |

* cited by examiner

*Primary Examiner* — David Bilodeau
(74) *Attorney, Agent, or Firm* — Schwabe, Williamson & Wyatt, P.C.

(57) ABSTRACT

Systems, apparatuses, methods, and computer-readable media, are provided for Radio Frequency (RF) gain calibration and/or characterization of one or more RF transmitter and/or receivers, to calibrate RF gain variations caused by various factors, such as temperature changes, operating frequency changes, processing and manufacturing variations, and/or offset of voltage supplies and controls. RF gain calibration and/or characterization are performed with respect to active RF components. Other embodiments may be described and/or claimed.

22 Claims, 7 Drawing Sheets

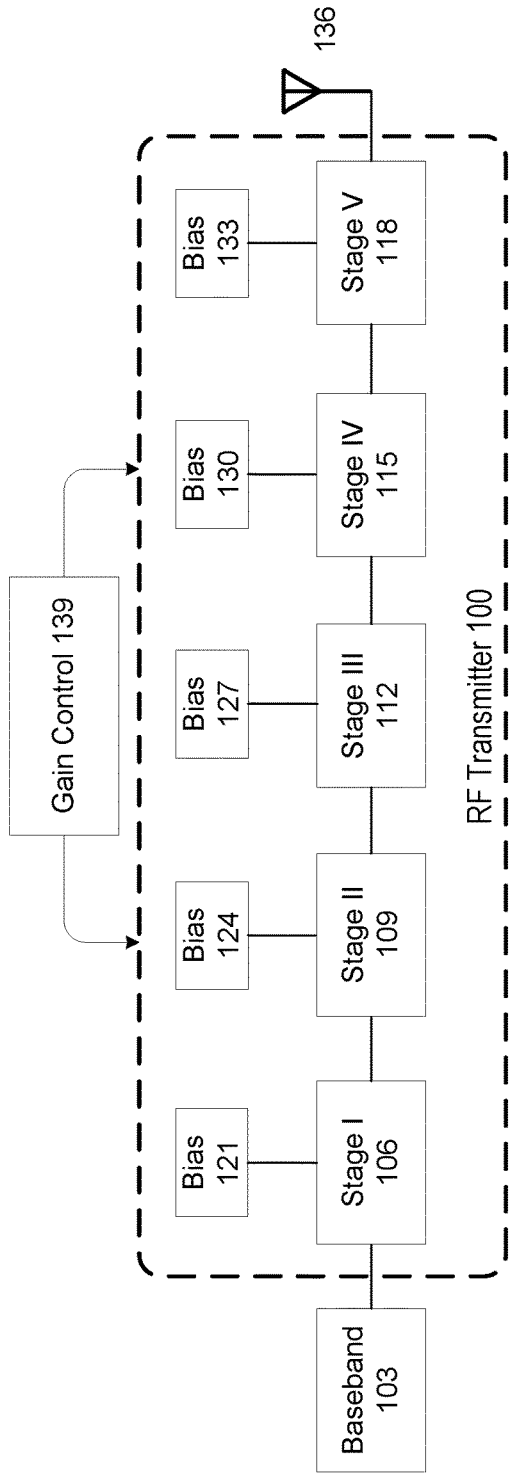
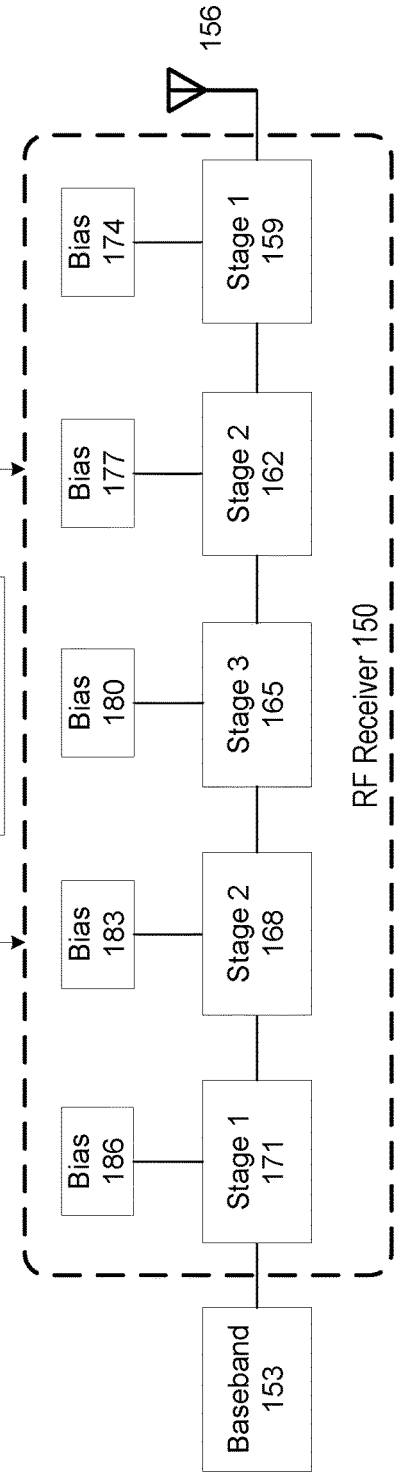

TECHNOLOGIES FOR ONLINE GAIN LINEUP IN MILLIMETER WAVE TRANSCEIVERS

FIELD

Various embodiments generally relate to the fields of communication and Radio Frequency (RF) detection systems, and in particular, relate to transceiver gain lineup in microwave and Millimeter Wave (mmW) transmitters and receivers.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

RF and mmW transceivers are broadly used in various wireless and wired communication devices, subsystems, and systems. A transceiver may include one or more transmitters and receivers. On a system-level subsystem-level view, an RF or mmW transmitter may be electronically connected or coupled with a baseband transmitter to up-convert baseband signals to RF signals and transmit the RF signals wirelessly via one or more antennas. An RF or mmW receiver may receive RF signals and down-convert the RF signals to baseband signals so that a baseband receiver can further process the baseband signals.

RF transmitters and receivers, also known as RF chains, are desired to behave homogeneously over certain bandwidths, under certain bias voltage control, and/or within a reasonable temperature range. However, behaviors of RF components of the transmitters and/or receivers are sensitive due to multiple factors, such as processing variations, supply/bias voltages, temperature, and operating frequencies, which are so called "PVTF" factors. RF components of the same specifications may behave differently, due to the PVTF factors. Under the same bias voltage, the "same" RF components may manifest varied performance. Further, RF components are frequency specific and their performance is frequency dependent. Last but not least, RF components behave differently with temperature changes. Thus, RF component-level and chain-level calibrations are critical to deliver desired RF chain performance, e.g., desired RF gain of the chain. However, it may not be practical to calibrate each RF component of an RF chain to have desired individual gains from each RF component, because not all RF components are individually accessible for calibration due to highly integrated RF circuit or component design. Further, it may not even be possible to design all the access points for measuring individual RF components along the RF chain without impacting the RF chain performance. Thus a holistic approach in calibrating the whole RF chain is more beneficial.

RF component performance usually drifts away from its performance under a typical temperature, which is usually a room temperature, when the component operates under a higher or lower temperature than the typical temperature. Thus, RF components may behave differently under different in-field environments, such as temperature variations. It is beneficial to calibrate an RF chain prior to or during its in-field use.

In general, an RF chain includes more than one active component, and an RF chain operating at mmW frequency may include more active components because of multi-stage frequency conversion. When each RF component has its performance variation due to PVTF factors, multiple stages of RF active components can introduce larger gain variation of the entire RF chain. The "stage" is also referred to as RF block of RF component(s).

It is known that among PVTF variations, temperature impact may be a dominant factor in an RF chain performance. Thus, the temperature impact and caused variations need to be tracked and compensated for. Various embodiments herein minimize the gain variations caused by temperature variations, as well as frequency, voltage, and/or process variations, in an RF transmitter or receiver to provide desired RF gain of the chain and improve corresponding noise figure, linearity, and/or other system parameters.

BRIEF DESCRIPTION OF THE FIGURES

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 1A and 1B respectively depict an example RF transmitter and RF receiver in which various example embodiments may be practiced.

DETAILED DESCRIPTION

Figure 2:
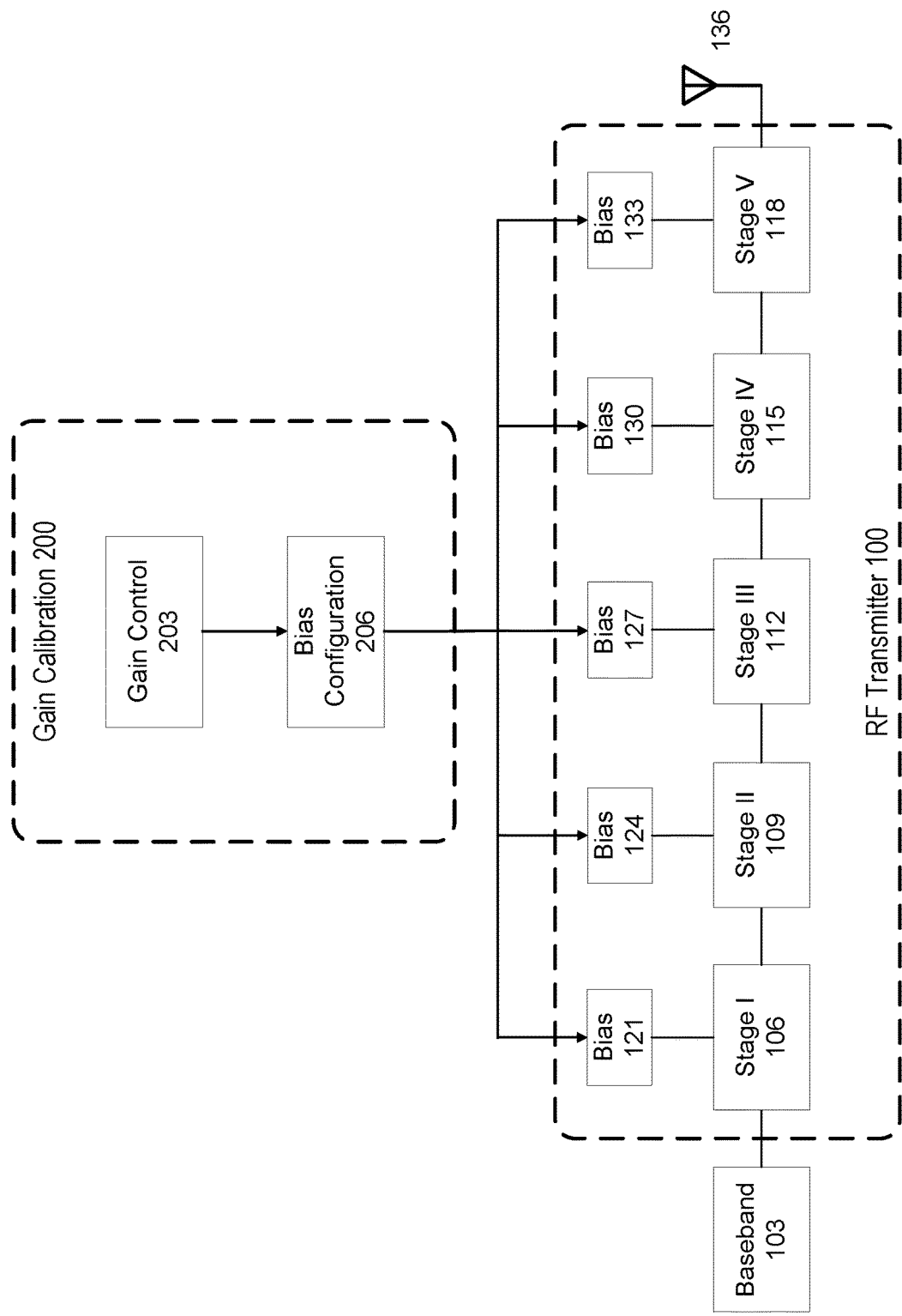
FIG. 2 schematically illustrates an example RF gain calibration circuitry with respect to gain calibration in accordance with various embodiments.

The present disclosure is related to gain calibration of RF chains. An RF chain may operate at mmW frequency and/or microwave frequency. RF frequency refers to the rate of oscillation of electromagnetic radio waves in the range of 3 kHz to 300 GHz, as well as the alternating currents carrying the radio signals. This is the frequency band that is used for communications transmission and broadcasting, radar application, Doppler detection, and/or other RF implementations. In general, an RF frequency range include microwave frequencies and mmW frequencies. mmW frequency may be referred to as a range from 30 GHz to 300 GHz. However, in some other area, a frequency range above 6 GHz may also be referred to as mmW, such as Frequency Range 2 (FR2) defined in $5^{th}$ Generation (5G) related specifications.

FIG. 1A schematically depicts an RF transmitter 100, in accordance with various embodiments. The RF transmitter 100 is electronically connected to or coupled with a baseband circuitry 103. The RF transmitter 100 may include multiple stages of components to up-convert one or more baseband signals from a Digital-to-Analog Converter (DAC) (not shown) to RF signals for RF signal transmission. In certain definition, the DAC may be defined as part of the RF chain. In the example of FIG. 1A, the RF transmitter 100 includes five stages, which are Stages I/II/III/IV/V, 106/109/ 112/115/118. Each stage is, or includes, at least one or more active RF components or devices to perform a function, e.g., up-converting the signal, amplifying the signal, etc. Compared to passive components, an active component used in RF circuits shares many characteristics with active components typically found in lower-frequency analog systems, which rely on a source of energy (usually from the DC circuit) and usually can inject power into a circuit. Active RF components include, but are not limited to, Power Amplifiers (PAs), Low Noise Amplifiers (LNAs), mixers, and Phase-Locked Loops (PLLs). Active components include, but are not limited to, amplifying components such as transistors, triode vacuum tubes (valves), and tunnel diodes. By contrast, passive components may not introduce net energy into the circuit. As a consequence they may not amplify (increase the power of a signal), although they may increase a voltage or current (such as is done by a transformer or resonant circuit). Passive components include, but are not limited to, two-terminal components such as resistors, capacitors, inductors, and transformers, and three-terminal components such as power dividers and combiners, and other multi-terminal components. Note that the terms "RF components" and "RF devices" are used interchangeably throughout this disclosure to represent RF active components or devices, if not otherwise clarified. Passive RF components are not discussed in this disclosure.

Each stage of the Stages I/II/III/IV/V 106/109/112/115/ 118 has its respective biases 121/124/127/130/133 to control certain performance aspects of the active RF components. The respective control biases 121/124/127/130/133 are to control the respective active RF components by changing corresponding bias voltage of the respective active RF components. A control bias can be one or more bits of digital control to set or control the associated bias voltage. The control bias may also be an analog control in some embodiments. For example, if the Stage V 118 is a power amplifier (PA), its bias control may be a 5-bit digital control to provide 32 settings for the PA. The 32 settings can correspond to the gain setting of the PA. If the PA has a gain range from 10 dB to 42 dB for instance, then the gain can be controlled by 1 dB steps. In some embodiments, the gain may be controlled non-linearly. For example, the gain can be controlled by finer steps in certain sub-ranges, and by more coarse steps in other sub-ranges.

A stage of the Stages I/II/III/IV/V 106/109/112/115/118 may be a mixer to up-convert a signal, an amplifier to amplify a signal, or some other active RF component. Note that in an RF transmitter, it is more common to have PAs than LNAs.

In some embodiments, the last active stage of the RF transmitter before an antenna 136, the Stage V 118 of the example illustrated in FIG. 1A, is usually a PA to amplify the RF signal to a certain power level so that it can be sufficiently transmitted and propagated. The antenna 136 may be one or more antennas, or an antenna array.

In some embodiments, the RF transmitter 100 may directly up-convert the baseband signal to the RF signal with one stage of up-conversion, in which, the baseband signal is directly up-converted to an RF signal by one-stage mixing. In some other embodiments, the RF transmitter 100 may up-convert the baseband signal to the RF signal with multiple stages of up-conversion. For example, the RF transmitter may include two stages of up-conversion, in which the RF transmitter is to up-convert the baseband signal to an Intermediate Frequency (IF) signal, then up-convert the IF signal to the RF signal. This is broadly used in mmW frequency applications. In a two-staged up conversion example RF chain, the Stage I 106 is a mixer to up-convert the baseband signal to an IF signal. The Stage II 109 is an amplifier to compensate any insertion loss (IL) caused by the Stage I mixer and/or amplify the IF signal to an adequate power level for the next-stage up-conversion. The Stage III 112 is a second mixer to up-convert the IF signal to the RF signal. The Stage IV 115 and Stage V 118 are two amplifiers to amplify the RF signal to an adequate power level for transmission by the antenna 136. The one or more baseband signals, IF signals, and RF signals may be one or more single tone, multi-tone, or modulated signals.

In various embodiments, the RF transmitter 100 is provided/complemented with the gain control technology of the present disclosure, which is schematically shown as a gain control module 139 in FIGS. 1A and is to be further described below with references to the remaining Figures.

FIG. 1B schematically depicts an RF receiver 150, in accordance with various embodiments. The RF receiver 150 is electronically connected to or coupled with a baseband circuitry 153. In some embodiments, the RF receiver 150 is electronically coupled to an Analog-to-Digital (ADC) circuitry of baseband circuitry. In other embodiments, the ADC may be considered as part of the RF chain as well. The RF receiver 150 may include multiple stages of components to down-convert one or more RF signals to baseband signals upon RF signal reception via an antenna 156. In the example of FIG. 1B, the RF receiver 100 includes five stages, which are Stages I/II/III/IV/V, 159/162/165/168/171. Each stage is or includes at least one or more active RF components or devices to perform a function, e.g., down-converting the signal, amplifying the signal, etc.

Each stage of the Stages I/II/III/IV/V 159/162/165/168/ 171 has its respective control biases 174/177/180/183/186 to control certain performance aspects of the active RF components. The respective control biases 174/177/180/183/186 are to control the respective active RF components by changing corresponding bias voltage of the respective active RF components. The control bias can be one or more bits of digital control to set or control the associated bias voltage. The control bias may also be an analog control in some embodiments. For example, if the Stage I 159 is an LNA, its bias control may be a 5-bit digital control to provide 32 settings for the LNA. The 32 settings can correspond to the gain control for the LNA. If the LNA has a gain range from 10 dB to 42 dB for instance, then gain can be controlled by 1 dB steps. In some embodiments, the gain may be controlled non-linearly. For example, the gain can be controlled by finer steps in certain sub-ranges and by more coarse steps in other sub-ranges.

To most RF transmitters and receivers, there are several relevant parameters to determine their performance. Those parameters include, but are not limited to, Noise Figure (NF) and linearity. NF indicates measures of degradation of a signal-to-noise ratio (SNR) caused by components in an RF chain. It is a number with lower values indicating better performance of the RF chain. It is critical to have low NF to ensure desired receiver SNR. Linearity refers to the ability of a component or RF chain to provide an output signal that is directly proportional to an input signal. As a result, the relationship of the signal input to the signal output as a function of frequency is a straight line. Achieving good linearity is crucial to preserving key pulse characteristics in a radar system and/or modulation quality in a communications system.

FIGS. 1A and 1B, respectively, depict the RF transmitter 100 and RF receiver 150, which respectively have 5 stages of bias controls with respect to 5 active RF components. For the sake of discussions herein, it is assumed that each bias control is a 5-bit voltage control. Those controls can tune and/or calibrate the performance of each stage and further calibrate the performance of the RF chain, aiming to provide consistent RF gains over temperature variations, as well as operating frequency changes and voltage response variations caused by manufacturing/processing inconsistencies. Here, each stage has $2^5=32$ possible outputs due to the 32 possible bias controls. With 5 stages being in the RF chain, there would be $(2^5=32)^5$ possible RF chain variances in theory, which leads to impractically large iterations for RF chain calibration if all possibilities are considered. In real mmW applications, even more RF active stages are to be implemented, which may cause further challenges in chain calibration. Further, due to the PVTF factors, each stage may have its individual gain settings. Thus, it is rather challenging, if not completely impractical, to use multiple pre-defined bias Look-Up Tables (LUTs) in this situation. A conventional pre-defined bias LUT has look-up values for calibrating a single stage. When multiple stages are required to be calibrated in an RF chain, multiple LUTs are presented, which may exponentially increase corresponding calibration iterations and occupy large memory space. Thus, it becomes impractical to use LUTs for multi-stage RF chains.

Analog bias circuitry control is another conventional active RF component control. However, this method requires process calibrations with respect to individual RF components and cannot track temperature information accurately. Thus, this method is also limited in multi-stage RF chain calibrations.

Conventional Transmission Power Control (TPC) and/or Automatic Gain Contron (AGC) also may not work well for multi-stage RF chain calibrations. The TPC includes a variable gain amplifier that can be controlled in 1 dB steps for an RF transmitter. The AGC function of a receiver it to automatically control the gain by a signal from the baseband block based on feedback mechanism. Neither the TPC or the AGC works well under multi-stage active RF chains, due to partial considerations of the chain. Linearity and/or NF of the RF chain may be degraded during gain calibration in the TPC or AGC.

Various embodiments herein reduce/minimize the gain variations caused by temperature variations, as well as frequency, voltage, and/or process variations, in an RF transmitter or receiver to provide desired RF gain of the chain and improve corresponding noise figure, linearity, and/or other system parameters. The gain calibration can be performed prior to, or during, RF chain operations.

In various embodiments, the RF receiver 150 is similarly provided/complemented with the gain control technology of the present disclosure as mentioned with respect to FIG. 1A, and is to be further described below with references to the remaining Figures. Note that a second gain control module 189 that is the same as or substantially similar to the gain control module 139 may be implemented to provide the gain control technology.

I. RF Gain Calibration

Referring to FIG. 2, where an example RF gain calibration circuitry 200 (hereinafter "gain calibration") in accordance with various embodiments, is shown. The gain calibration 200 includes gain control circuitry 203 and a bias configuration circuitry 206. The gain control circuitry 203 and the bias configuration circuitry 206 are electronically coupled, and the gain control circuitry 203 can indicate to the bias configuration circuitry 206 to configure respective bias controls 121/124/127/130/133. The gain control circuitry includes a set of gain control vectors, $\vec{B}_1, \vec{B}_2 \ldots \vec{B}_N$. Vector $\vec{B}_N$ includes a set of control values to configure respective bias control. Corresponding to the example RF transmitter 100, the vector $\vec{B}_N$ includes $b_{N1}, b_{N2} \ldots b_{N5}$, since there are 5 stages of active RF components that need to be biased. The Vector $\vec{B}_N$ may be pre-determined from a manufacture characterization based on RF transmitter design, during an in-field initialization, or at any proper stage throughout product lifetime. More details with respect to determination of this vector set is illustrated infra discussions with respect to FIG. 3.

In some embodiments, a set of vector $\vec{B}_1, \vec{B}_2 \ldots \vec{B}_N$ may be determined to correspond to a set of RF transmitter gains that the RF transmitter 100 is designed to provide. For example, if the RF transmitter is designed to provide a range of RF gains of 30 dB, 30 gain control vectors $\vec{B}_1 \ldots \vec{B}_{30}$ with 1 dB steps can be provided. Other fixed or variable steps can be used in determining the control vectors. A fixed step value is referred to as calibration resolution. Further, each vector is determined to provide a particular RF gain in consideration of other important system or chain parameters, such as NF and/or linearity, so that the determined vector is designed to provide optimized or close-to-optimized chain performance with the particular RF gain under consideration of certain system parameters. The number of the vectors $\vec{B}_N$ may vary depending on various system specifications and system design limits. Note that the set of vectors $\vec{B}_1, \vec{B}_2 \ldots \vec{B}_N$ are determined under a baseline temperature and a baseline frequency. Such a baseline temperature may be a room temperature or some other specific temperature selected by design. Thus, the set of $\vec{B}_1, \vec{B}_2 \ldots \vec{B}_N$ corresponds to a set $\vec{G}$ of RF gains, $G_1, G_2 \ldots G_N$, whose relation is held as in below Relation 1. In one example embodiment, $G_1$ represents a minimum RF gain of the chain and $G_N$ represents a maximum RF gain of the chain. Each gain of individual stages or RF blocks corresponding to the minimum RF gain $G_1$ may be a minimum gain of its associated RF block, and each gain of individual stages or RF blocks corresponding to the maximum RF gain $G_N$ may be a maximum gain of its associated RF block.

$$\begin{bmatrix} \vec{B_1} \\ \vec{B_2} \\ \vdots \\ \vec{B_N} \end{bmatrix} = \begin{bmatrix} b_{11} & b_{12} & \ldots & b_{1N_{BLK}} \\ b_{21} & b_{22} & \ldots & b_{2N_{BLK}} \\ \vdots & \vdots & \ddots & \vdots \\ b_{N1} & b_{N2} & \ldots & b_{NN_{BLK}} \end{bmatrix} \leftrightarrow \begin{bmatrix} G_1 \\ G_2 \\ \vdots \\ G_N \end{bmatrix} = \vec{G} \quad \text{Relation 1}$$

In some embodiments, once the gain control vector set is determined, the grain control circuitry 203 can determine an RF transmitter gain $G_i$ for a particular transmission setting. Then the gain control circuitry 203 indicates the bias configuration circuitry 206 to configure the individual bias controls 121/124/127/130/133 to realize the gain $G_i$ for the RF transmitter 100. The bias configuration circuitry 206 configures the individual bias controls 121/124/127/130/133 accordingly.

In some embodiments, one or more RF components may not operate under the baseline temperature. Then the one or more gains of the RF stages may drift away from the gain corresponding to the baseline temperature. In accordance, the RF gain of the transmitter 100 may be different from the desired gain $G_i$. When the RF transmitter 100 is implemented with power detector or similar power detection circuitry to detect actual gain of the transmitter 100 in use, the actual RF gain of the transmitter 100 can be measured in an open-loop RF gain measurement. In the open-loop RF gain measurement, one or more power detectors can detect the power levels at the input of the RF transmitter 100 and at the output of the RF transmitter 100, hence to calculate corresponding power gain of the transmitter, when the RF transmitter 100 is in an open-loop setting. Accordingly, a gain error or difference between the actual RF gain and the desired gain can be determined. Based on the gain error, the gain control circuitry 203 can adjust or change the original bias control vector to a proper bias control vector to compensate the gain error. For instance, if the desired gain $G_i$ is 10 dB and the actual gain is 8 dB due to an increased temperature, a compensated gain $G_{i+2}$ is to be used to compensate the gain error of 2 dB (10 dB−8 dB=2 dB), assuming the calibration resolution is 1 dB. Thus, the bias control vector $\vec{B_{i+2}}$, which corresponds to $G_{i+2}$=12 dB, will be used to configure the bias controls 121/124/127/130/133.

In some embodiments, each gain error for each gain of the gain set $\vec{G}$ can be measured or determined under a particular RF chain temperature. The set of gain errors corresponding to the gain set $\vec{G}$ can be denoted as the gain error set $\overrightarrow{G_{Error}}$. Accordingly, the bias control vector set of $\vec{B_i}$ can be adjusted or calibrated with respect to a set of gain considering the gain errors, over the particular temperature. Relation 2 depicts a set of adjusted bias control vector $\vec{B_i}$.

$$\begin{bmatrix} \vec{B_1} \\ \vec{B_2} \\ \vdots \\ \vec{B_i} \\ \vdots \\ \vec{B_N} \end{bmatrix} \leftrightarrow \begin{bmatrix} G_1 - G_{1(Error)} \\ G_2 - G_{2(Error)} \\ \vdots \\ G_i - G_{i(Error)} \\ \vdots \\ G_N - G_{N(Error)} \end{bmatrix} \leftrightarrow \begin{bmatrix} G'_1 \\ G'_2 \\ \vdots \\ G'_i \\ \vdots \\ G'_N \end{bmatrix}, \quad \text{Relation 2}$$

$$\text{where} \begin{bmatrix} G_{1(Error)} \\ G_{2(Error)} \\ \vdots \\ G_{i(Error)} \\ \vdots \\ G_{N(Error)} \end{bmatrix} = \overrightarrow{G_{Error}}$$

Alternatively or additionally, a set of control vector adjustment $\vec{B_i'}$ can be determined based on the following Relation 3:

$$B' = \begin{bmatrix} \vec{B'_1} \\ \vec{B'_2} \\ \vdots \\ \vec{B'_i} \\ \vdots \\ \vec{B'_N} \end{bmatrix} \leftrightarrow \begin{bmatrix} G_1 - G_{1(Target)} \\ G_2 - G_{2(Target)} \\ \vdots \\ G_i - G_{i(Target)} \\ \vdots \\ G_N - G_{N(Target)} \end{bmatrix} = \overrightarrow{G_{Error}} \quad \text{Relation 3}$$

In one example, the change of the bias control vector set of $\vec{B_i}$ with different gain values ($G_1, G_2 \ldots G_N$) can be determined as ∂Bias/∂Gain. Such a relation of ∂Bias/∂Gain can be used to calibrate the gain control vectors over a particular temperature. Alternatively or additionally, a set of gain errors of a particular desired gain $G_i$ can be measured or determined according to a set of temperature changes. Then, a set of calibrated bias control vectors corresponding to $\vec{B_i}$ can be determined for calibrating a bias control vector $\vec{B_i}$ of a particular desired gain $G_i$ over a series temperature changes. In one example, the gain error vs. temperature can be determined based on ∂Gain/∂TEMP. Thus, knowing a temperature change ΔTEMP, the gain error can be derived from ΔTEMP×∂Gain/∂TEMP. Once the gain error is determined, an adjusted or calibrated bias control vector can be determined by the gain control circuitry 203. Note that the gain error may be referred to as a shift gain due to temperature changes.

Alternatively or additionally, if the temperature of the RF transmitter 100 can be measured or determined, the gain control circuitry 203 can determine the gain error based on a pre-determined gain drift table/curve vs. temperature. The pre-determined gain drift table or curve may be based on a general RF component temperature performance, a particular temperature performance of one or more RF components of the transmitter 100, or a combination thereof. The pre-determined gain drift table or curve can be measured and determined at manufacturing phase, an RF chain initialization in production phase or product initialization, or during one or more RF calibrations throughout the life-time of the transceiver. Further alternatively or additionally, the grain control circuitry 203 may determine a temperature difference between the measured temperature of the RF transmitter 100 and the baseline temperature. Then, the gain control circuitry 203 can determine the gain error based on the temperature difference according to a look-up table or curve of gain error vs. temperature difference from the baseline temperature. The above-mentioned pre-determined gain drift table or curve and/or the look-up table or curve of gain error may be stored in memory circuitry that is accessible to the gain control circuitry 203, or in the gain control circuitry 203 directly.

In some embodiments, the RF transmitter temperature is measured at one particular location on the transmitter 100 via one or more thermal sensors. The RF transmitter temperature may also be measured at multiple locations of the transmitter 100, or at one or more particular RF components. If multiple measurements are used, an averaging or weighted averaging may be used to determine the RF transmitter temperature.

It is noted that the RF receiver 150 may be implemented with the same or substantially similar gain calibration 200. In the implementation of the gain calibration 200 to the RF receiver 150, the gain configuration circuitry 206 may control the respective bias controls 174/177/180/183/186. A particular set of vectors $\vec{R}_1, \vec{R}_2 \ldots \vec{R}_N$ may be pre-determined for the receiver 150. Note that only the RF transmitter 100 and its corresponding vector set $\vec{B}_N$ is to be discussed to avoid redundancy. However, all the above discussions with respect to the RF transmitter 100 are applicable to RF receiver as well.

II. RF Gain Characterization

Figure 3:
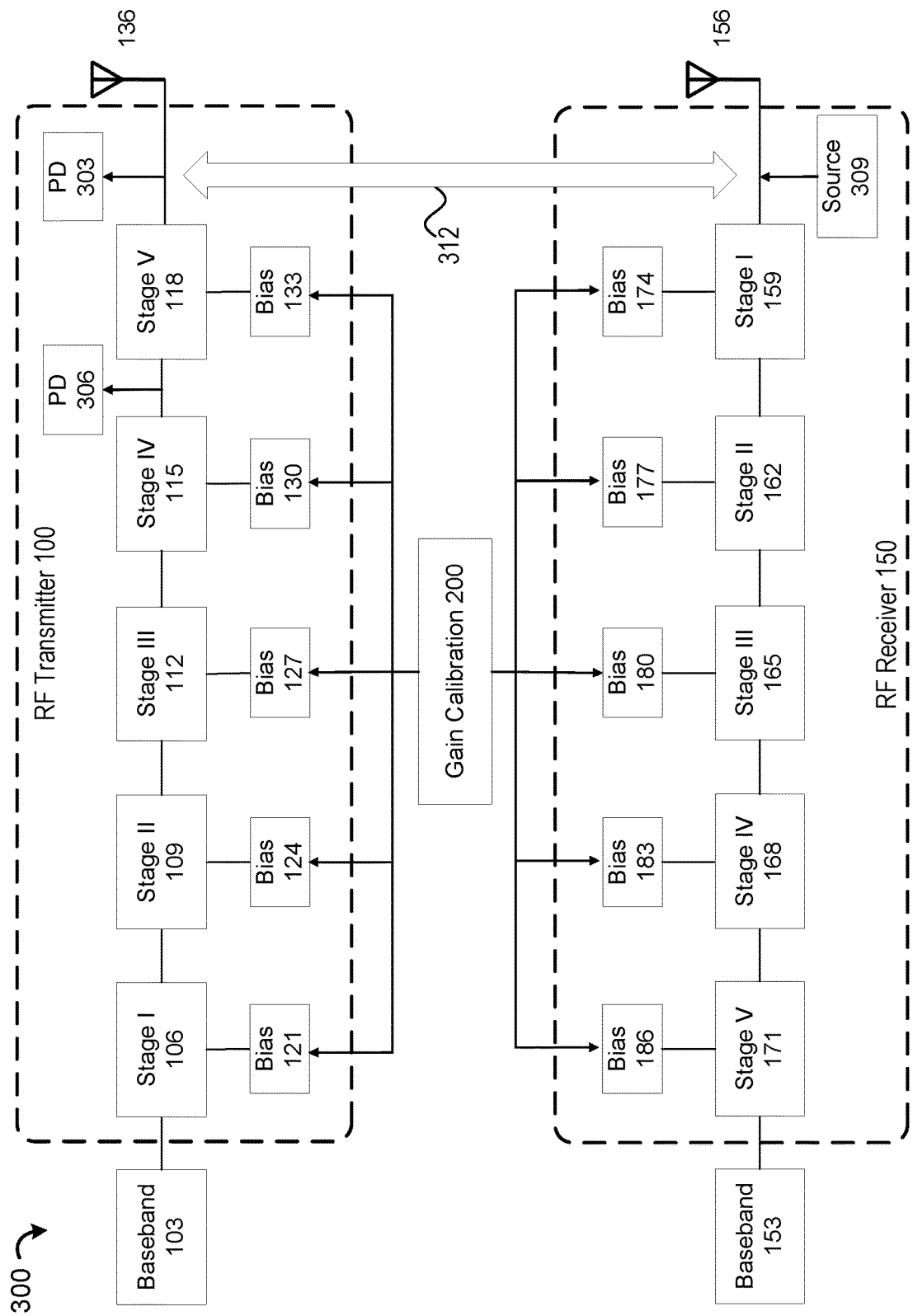
FIG. 3 schematically illustrates an example RF chain characterization in accordance with various embodiments.

FIG. 3 schematically illustrates RF chain characterization 300, in accordance with various embodiments. The gain calibration 200 can characterize the RF transmitter 100 and RF receiver 150 individually. The RF chain characterization 300 refers to a process to determine the set of gain control vector set $\vec{B}_N$ with associated gain values of $\vec{G}$ with respect to FIG. 2. The characterization can be performed initially at product manufacturing phase, transceiver initialization, or any other proper stage throughout product lifetime.

It is also noted that the RF receiver 150 may be implemented with the same or a substantially similar gain calibration engine or circuitry to the gain calibration 200. In one example implementation of the gain calibration 200 to the RF receiver 150, the gain calibration may control the respective bias controls 174/177/180/183/186, as shown in FIG. 3. In another example implementation, the same gain calibration 200 or a substantially similar one may be implemented to the RF receiver 150 only but not the RF transmitter 100. Note that only the RF transmitter 100 and its corresponding vector set $\vec{B}_N$ is to be discussed for the majority of the discussion to avoid redundancy. However, all the above and forward discussions with respect to the RF transmitter 100 are applicable to RF receiver as well.

In various embodiments regarding the RF transmitter 100 characterization, each $\vec{B}_I$ of a set of gain control vectors, $\vec{B}_1, \vec{B}_2 \ldots \vec{B}_N$, provides a set of bias gain controls to set respective active RF stages to tune the transmitter 100 with a target RF gain. Each vector $\vec{B}_I$ includes a set of control values to configure respective bias control. Corresponding to the example transmitter 100, the vector $\vec{B}_I$ includes $b_{i1}$, $b_{i2} \ldots b_{i5}$, since there are 5 stages of active RF components that need to be biased. Depending on the configuration of each specific RF active stage, a specific bias control may be a single or multiple digital control to configure a corresponding RF active component. A specific bias control value of $b_{i1}$, $b_{i2} \ldots b_{i5}$ may be a value corresponding to the specific digital control. For example, if the RF active Stage 4 includes a transmitter amplifier that has a gain range from 0 to 15 dB with a 1 dB increment, the $b_{i4}$ has a range of values from 0 to 15, which can be indicated by 0000 to 1111 in binary format. Each vector $\vec{B}_i$ is determined or aimed to realize a target RF gain for the transmitter 100. An RF gain set $\vec{G}$ can be determined based on the transmitter specifications. For example, a set of gain values from 10 to 40 may be used for a specific RF transmitter 100. In such a case, 30 vectors $\vec{B}_1 \ldots \vec{B}_{30}$ are to be determined to realize or aim to realize respective gains of 10-40 dB. In this example, the RF gain resolution is 1 dB. Note that various gain ranges and resolutions can be configured for the transmitter 100. The gain control values of each vector $\vec{B}_I$ are determined based on considerations of RF system parameters, including but not limited to, linearity and NF, to provide an optimized or close-to optimized RF system performance.

As discussed with respect to FIG. 2, possible combinations of bias gain control settings can be a significantly large number with multi-stage RF chain architectures. Thus, certain bias gain control values are to be selected for setting up the vector $\vec{B}_I$. For example, a lower RF gain may reduce one or more individual gains of the respective RF stages from a higher RF gain, and those one or more respective RF stages are the first stages of the transmitter 100, such as the Stages 121 and/or 124. This is because better linearity may be preserved by reducing the gains of the first stages. Thus, corresponding bias control values $b_{i1}$, $b_{i2}$ may be reduced before other control values $b_{i3}$-$b_{i5}$ to be reduced in lowering the RF gain. In an RF receiver characterization, for a lower RF gain configuration, similarly, the gains of first one or more stages of the RF stages, e.g., Stages 159 and/or 162, may be reduced before others, in achieving better linearity and NF of the RF receiver 150. The gain control values are selected based on various factors, which include, but are not limited to, specific RF component designs/specifications, and RF system parameters.

Once a set of vectors $\vec{B}_N$ is determined, the gain calibration 200 can configure the set of vector $\vec{B}_N$ respectively to the transmitter 100. For each vector $\vec{B}_I$ being configured to the transmitter 100, a power detector 303 can measure the output power of the transmitter 100. The power detection measurement point is at the output of the last Stage 118. In some other embodiments, an alternative or additional power detector 306 can measure the output power at the second last Stage 115. When the output power before the last PA needs to be measured, the power detector 306 should be used instead of power detector 303. The power detector 306 may be used to measure a power level before the final PA, because in the transmitter characterization, the RF transmitting signal is not to be transmitted out via the antenna 136 and the output signal may be capped to a limited power level that is lower than the output power level in real transmission due to power detector's limitations. Accordingly, the performance of the last stage PA may be estimated separately. Once the output power level is measured and determined, the RF gain can be derived based on the known baseband output signal power level or RF input power level at or before the input of the first RF Stage 106.

At the baseline temperature, RF gains of the transmitter 100 are to be measured corresponding to respective target gains and the associated bias control vectors. Upon finishing the measurements of all RF gains with corresponding target gains and the associated bias control vectors, the RF transmitter characterization is performed and a relation between the set of bias control vectors and measured gains ($\vec{B} \rightarrow \vec{G}$) can be established. The relation, e.g., Relation 1, may be stored in a look-up table or other forms of storage.

In some embodiments, after a baseline $\vec{B} \rightarrow \vec{G}$ relation is determined, the same transmitter 100, or another transmitter that is supposed to have the identical RF performance, may be detected to have offset gain, in which the same $\vec{B}_I$ is to generate a different RF gain than desired $G_i$. Then, the one or more bias control values of $\vec{B}_I$ are to be calibrated to deliver the desired $G_i$. In some other embodiments, the shifted gain may be recorded as part of the calibration process as well.

When characterizing the RF receiver 150, an adequate signal source 309 is used to provide a source signal at the input port of the first Stage of the receiver 150, e.g., Stage 156, for RF receiver characterization. Then the output signal of the receiver 150 is to be measured at the output of the last stage of the receiver, e.g., Stage 171. Accordingly, the RF gain of the receiver 150 can be derived based on the power levels of RF input signal and the output baseband signal. A relation between the receiver gain and bias gain control vector of the receiver 150 can be established for the RF transmitter 100.

In some embodiments, the RF input signal for receiver characterization can be provided by a transmitter loopback 312, in which the transmitter 100 provides the adequate RF input signal for the receiver characterization. The characterized or calibrated transmitter 100 can provide the RF signal with accurate power level, due to proper characterization and/or calibration. The RF input signal can be provided by the last stage or the second last stage of the transmitter 100, e.g., Stage 133 or Stage 130. Either Stage 133 or 130 can be used depending on the required power level of the RF input signal. This internal loopback characterization may provide various benefits compared with external receiver characterization, such as requiring less test equipment, less wiring, better controllability, etc.

Alternatively or additionally, the above-discussed RF chain characterization and calibration with respect to temperature variance may be used for RF chain characterization and/or calibration with respect to other parameters. For example, similar RF chain characterization and calibration can be performed with respect to frequency variance. RF components or devices are frequency sensitive and may drift their performance (e.g., gain) significantly with frequency changes. Thus, RF chain characterization and calibration with respect to frequency may improve RF chain performance and provide calibrated and consistent gains over a broader frequency range. The pertinent RF chain characterization and calibration can be performed via single tone, multiple tone, or modulated signals.

Figure 4:
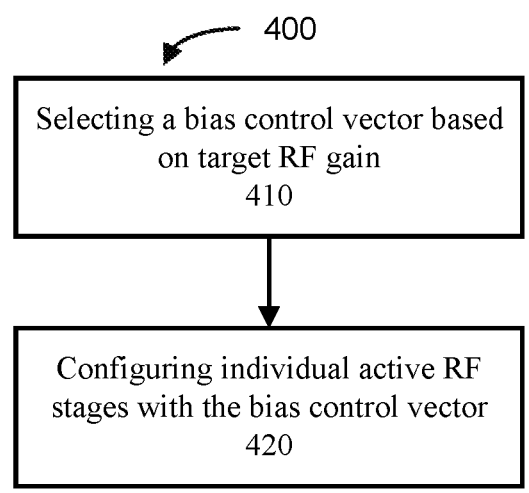
FIG. 4 illustrates an operation flow/algorithmic structure to facilitate a process of RF gain calibration with some embodiments.
Figure 5:
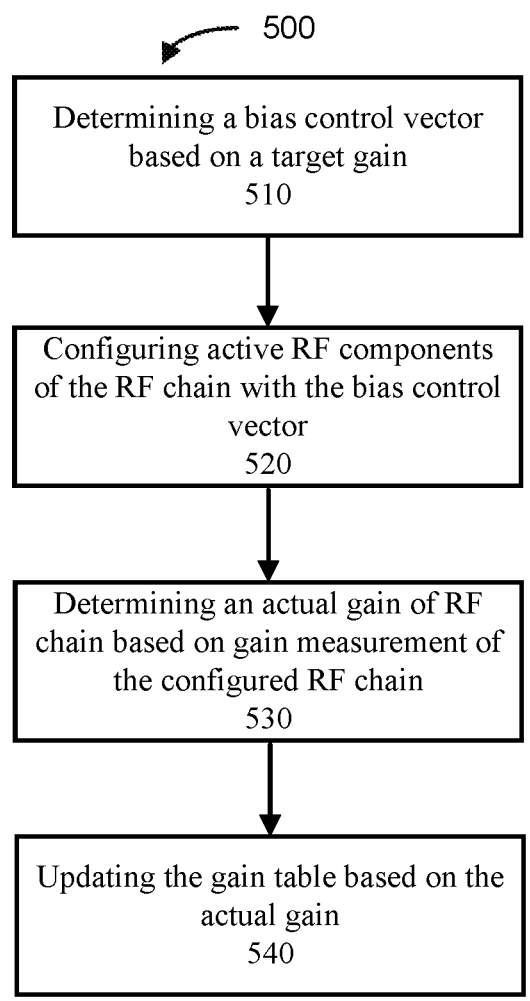
FIG. 5 illustrates an operation flow/algorithmic structure to facilitate the process of RF chain characterization in accordance with some embodiments.

FIGS. 4-5 show example calibration and characterization procedures 400 and 500, respectively, in accordance with various embodiments. For illustrative purposes, the various operations of processes 400 and 500 are described as being performed by one or more gain calibration 200 including, but not limited to, the gain control circuitry 203 and bias configuration circuitry 206, coupled with one or more RF transmitters 100 and/or RF receivers 150, known as RF front-end (RFFE) module(s). Additionally, the various messages/signaling are to be communicated between the gain control circuitry 203 and the bias configuration circuitry 206 with respect to FIGS. 2-3, and using the various mechanisms discussed herein, including those discussed infra with respect to FIGS. 6-8. While particular examples and orders of operations are illustrated FIGS. 4-5, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 4 illustrates an operation flow/algorithmic structure 400 to facilitate a process of RF gain calibration by the gain calibration 200 in accordance with some embodiments with respect to FIG. 2. The operation flow/algorithmic structure 400 may be performed by the gain control circuitry 203, the bias configuration circuitry 206, and/or other circuitry thereof.

The operation flow/algorithmic structure 400 may include, at 410, selecting a bias control vector from a set of bias control vectors associated with respective gain values, based at least in part on a target gain of the RFFE module. This may be performed by the gain control circuitry 203 or other circuitry thereof. The bias control vector includes a set of control values, and each control value of the set of control values is to configure a corresponding active RF stage of the active RF stages of the RFFE module. The set of bias control vectors is the same as, or substantially similar to, the set of bias control vector $\vec{B}_N$ with respect to discussion in FIGS. 2 and 3. The set of bias control vectors may be pre-determined and/or based on the RF chain (or RFFE module) characterization with respect to discussions in FIGS. 2-3 and FIG. 5. The RFFE module includes one or more RF transmitters and one or more RF receivers, which are the same as, or substantially similar to, the RF transmitter 100 and RF receiver 150 with respect to discussion in FIGS. 1-3. The active RF stages include mixers, amplifiers, PLLs, and other RF active components or devices.

The target gain corresponds to a gain of the RFFE module that the RFFE module is determined to provide with respect to a baseline RFFE temperature and a baseline RFFE operating frequency, which is the same as, or substantially similar to, the target gain G with respect to discussion in FIGS. 2 and 3.

The operation flow/algorithmic structure 400 may further include, at 420, configuring individual active RF stages of the RFFE module with the selected bias control vector. This may be performed by the configuration circuitry 206 or other circuitry thereof.

Further detailed procedures of RF gain calibration are in accordance with various embodiments with respect to FIG. 2 and illustrated in infra Examples 1-14 and some other examples.

FIG. 5 illustrates an operation flow/algorithmic structure 500 to facilitate a process of RF gain characterization by the gain calibration 200 in accordance with some embodiments with respect to FIG. 3. The operation flow/algorithmic structure 500 may be performed by the gain control circuitry 203, the bias configuration circuitry 206, and/or other circuitry thereof.

The operation flow/algorithmic structure 500 may include, at 510, determining a bias control vector based on a target gain of an RF transceiver, according to a gain table of a plurality of RF gain values of the at least one RF transmitter or receiver associated with respective bias control vectors. The RF transceiver may include one or more RF transmitters 100 and/or receivers 150. This may be performed by the gain control circuitry 203 or other circuitry thereof. The bias control vector includes a set of control values, and each control value of the set of control values is to configure a corresponding active RF component of the RF transmitter or receiver. The set of bias control vectors is the same as, or substantially similar to, the set of bias control vector $\vec{B}_N$ with respect to discussions in FIGS. 2 and 3. The gain table may be pre-determined based on component-level and/or system-level performance of the RF transmitter or receiver.

The target gain corresponds to a gain of the RF transmitter or receiver that the RF transmitter or receiver is determined to provide with respect to a baseline transceiver temperature and/or operating frequency, which is the same as, or substantially similar to, the target gain G with respect to discussions in FIGS. 2 and 3.

The operation flow/algorithmic structure 500 may further include, at 520, configuring active RF components of the RF transmitter or receiver with the bias control vector. The bias control vector includes a set of control values, and each control value is to configure a corresponding active RF component of the active RF components of the RF transmitter or receiver. This may be performed by the configuration circuitry 206 or other circuitry thereof.

The operation flow/algorithmic structure 500 may further include, at 530, determining an actual gain of the at least one RF transmitter or receiver based on a gain measurement of the configured RF transmitter or receiver. The measurement of the gain may adopt the same, or substantially similar, procedures based on power detections discussed with respect to FIG. 3. In the RF receiver 150, the power detection is to be regard the RF input power of the source 309 or before the Stage I 159 and the output power level of the RF receiver 150 at the output of the Stage V 171. The gain control circuitry 203 can acquire or receive the measured or derived actual gain accordingly. In a transmitter characterization, the gain measurement is an open-loop transmitter measurement.

The operation flow/algorithmic structure 500 may further include, at 540, updating the gain table based on the actual gain. Updating the gain table is to update the target gain value with the actual gain. In particular, the gain control circuitry 203 may associate the actual gain value with the bias control vector that is used to configure the RF stages for the target gain.

Further detailed procedures of RF gain characterization are in accordance with various embodiments with respect to FIG. 3 and illustrated in infra Examples 14-20 and some other examples.

Example Framework, Device, and Infrastructure Implementations

Figure 6:
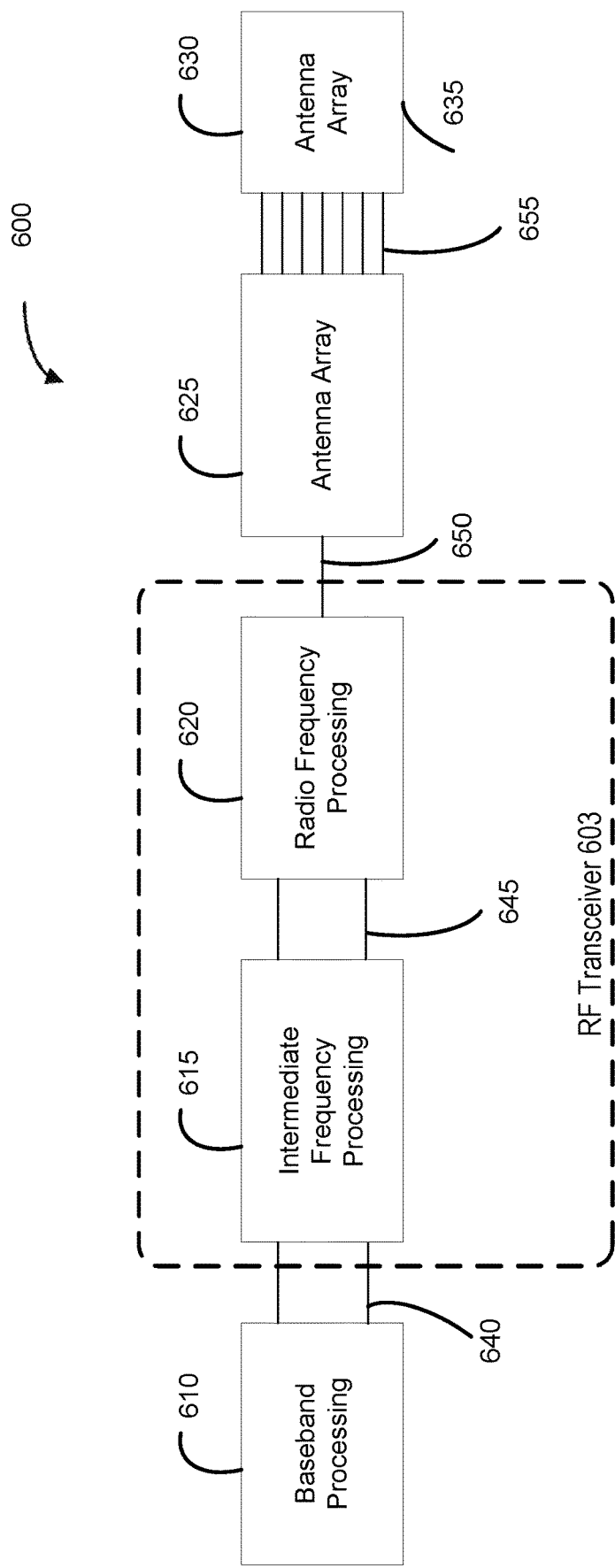
FIG. 6 schematically illustrates an example block diagram of an architecture of a wireless transceiver, in accordance with various embodiments.

FIG. 6 schematically illustrates an example block diagram of an architecture of an RF chain, RFFE, or RF transceiver 603 implemented in a wireless transceiver device 600 (hereinafter "device 600"), in accordance with one or more embodiments. The device 600 may be a smartphone (for example, a handheld touchscreen mobile computing device connectable to one or more cellular networks), but may also comprise any mobile or non-mobile computing devices, such as a Personal Data Assistant (PDA), pager, laptop computer, desktop computer, wireless handset, customer premises equipment (CPE), fixed wireless access (FWA) device, a computer-assisted/autonomous driving (CA/AD) vehicle, a radar system thereof, wireless handsets, unmanned vehicles or drones, vehicle mounted User Equipment (UE) or any computing device including a wireless communications interface. In some embodiments, the transceiver 600 can comprise an Internet of Things (IoT) UE, which can comprise a network access layer designed for low-power IoT applications utilizing short-lived UE connections. An IoT UE can utilize technologies such as narrowband IoT (NB-IoT), machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An NB-IoT/MTC network describes interconnecting NB-IoT/MTC UEs, which may include uniquely identifiable embedded computing devices (within the Internet infrastructure), with short-lived connections. The NB-IoT/MTC UEs may execute background applications (for example, keep-alive message, status updates, location related services, etc.).

The device 600 may be an Access Node (AN) in a wireless communication or network. The AN can be referred to as a base station (BS), NodeB, evolved-NodeB (eNB), next-generation eNB (ng-eNB), next-generation NodeB (gNB or ng-gNB), NG-RAN node, cell, serving cell, neighbor cell, primary cell (PCell), secondary cell (SCell), primary SCell (PSCell), and so forth, and can comprise ground stations (for example, terrestrial access points) or satellite stations providing coverage within a geographic area. The AN can be the first point of contact for the UE. In some embodiments, the AN can fulfill various logical functions including, but not limited to, radio network controller (RNC) functions such as radio bearer management, uplink and downlink dynamic radio resource management and data packet scheduling, and mobility management.

The device 600 includes baseband processing circuitry 610, Intermediate Frequency (IF) processing circuitry 615 if applicable, RF processing circuitry 620, an antenna-array matching network 625, and an antenna array 630. In this disclosure, the IF processing circuitry 615 and RF processing circuitry 620 together are referred as the RF transceiver 603.

In some embodiments, baseband processing circuitry 610 may include multiple parallel baseband chains. IF and RF processing circuitry 615 and 620 may include multiple parallel RF chains or branches corresponding to one or more baseband chains. One baseband chain may be connected with one or more RF chains and one RF chain may be connected with one or more baseband chains, depending on various UE architectures. Each RF chain or branch may be coupled with one antenna-array matching network 625, which may be connected with one or more antenna arrays 630. It is noted that "baseband chain," "baseband branch," and "baseband port" are used interchangeably in this application.

In some embodiments, the device 600 may include protocol processing circuitry that may include one or more instances of control circuitry to provide control functions for the baseband processing circuitry 610, IF processing circuitry 615, RF processing circuitry 620, antenna-array feeding network 625, and antenna array(s) 630.

In some embodiments, the gain calibration 200 including the gain control circuitry 203 and the configuration circuitry 206 may be implemented as part of the RF transceiver 603. The gain calibration 200 may be a module integrated with the RF transceiver 603. In some other embodiments, the gain calibration 200 may be implemented as part of the device 600 and communicates and control the RF transceiver the gain control circuitry 203 and the configuration circuitry 206, in accordance with various embodiments with respect to FIGS. 2-5.

Figure 7:
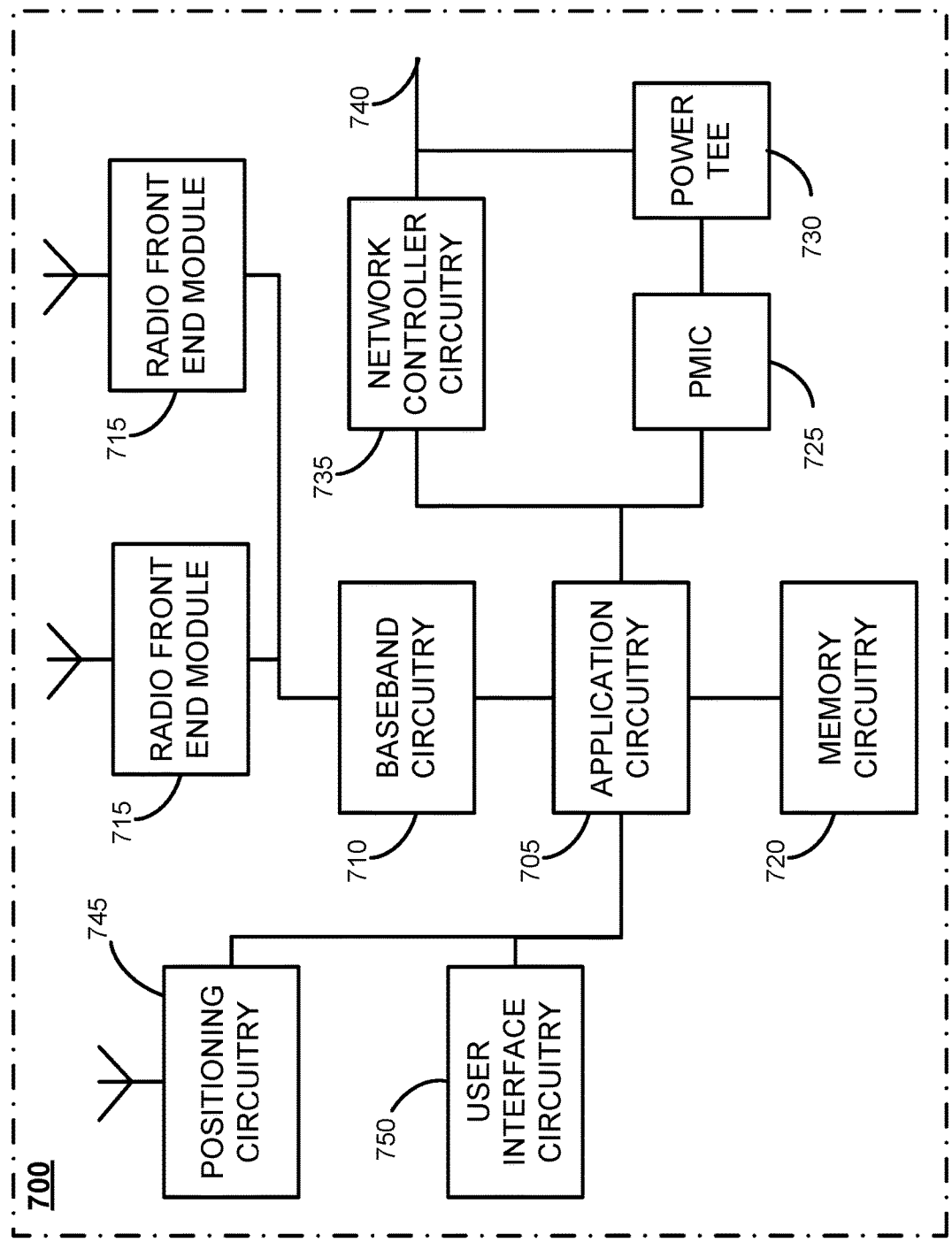
FIG. 7 depicts an example of infrastructure equipment according to various embodiments.

FIG. 7 illustrates an example of infrastructure equipment 700 in accordance with various embodiments. The infrastructure equipment 700 (or "system 700") may be implemented as a base station, radio head, access network node (e.g., the (R)AN nodes and/or AN shown and described previously), server(s), and/or any other element/device discussed herein. In other examples, the system 900 could be implemented in or by a UE, a radar system in a CA/AD vehicle.

The system 700 includes application circuitry 705, baseband circuitry 710, one or more radio front end modules (RFEMs) 715, memory circuitry 720, power management integrated circuitry (PMIC) 725, power tee circuitry 730, network controller circuitry 735, network interface connector 740, positioning circuitry 745, and user interface 750. The RFEMs may be referred to as RFFE modules as well. In some embodiments, the system 700 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 705 includes circuitry such as, but not limited to one or more processors (or processor cores), cache memory, and one or more of low drop-out voltage regulators (LDOs), interrupt controllers, serial interfaces such as SPI, I²C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 705 may be coupled with or may include memory/ storage elements and may be configured to execute instructions stored in the memory/storage to enable various applications or operating systems to run on the system 700. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 705 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 705 may comprise, or may be, a special-purpose processor/controller to operate according to the various embodiments herein. As examples, the processor(s) of application circuitry 705 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 700 may not utilize application circuitry 705, and instead may include a special-purpose processor/controller to process IP data received from an EPC or SGC, for example.

In some implementations, the application circuitry 705 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 705 may comprise logic blocks or logic fabric, and other interconnected resources that may be programmed to perform various functions, such as the procedures, methods, functions, etc. of the various embodiments discussed herein. In such embodiments, the circuitry of application circuitry 705 may include memory cells (e.g., erasable programmable read-only memory (EPROM), electrically erasable programmable read-only memory (EEPROM), flash memory, static memory (e.g., static random access memory (SRAM), antifuses, etc.)) used to store logic blocks, logic fabric, data, etc. in look-up-tables (LUTs) and the like.

In some implementations, such as implementations where subsystems of the RF transceiver 603 and/or the gain calibration 200 of FIGS. 2-5 (e.g., gain control circuitry 203, configuration circuitry 206, or other like subsystems/components) are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 705 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 710 may be implemented, for example, as a solder-down substrate including one or more integrated circuits, a single packaged integrated circuit soldered to a main circuit board or a multi-chip module containing two or more integrated circuits. The baseband circuitry 710 includes one or more processing devices (e.g., baseband processors) to carry out various protocol and radio control functions. Baseband circuitry 710 may interface with application circuitry of system 700 for generation and processing of baseband signals and for controlling operations of the RFEMs 715. The baseband circuitry 710 may handle various radio control functions that enable communication with one or more radio networks via the RFEMs 715. The baseband circuitry 710 may include circuitry such as, but not limited to, one or more single-core or multi-core processors (e.g., one or more baseband processors) or control logic to process baseband signals received from a receive signal path of the RFEMs 715, and to generate baseband signals to be provided to the RFEMs 715 via a transmit signal path. In various embodiments, the baseband circuitry 710 may implement a real-time OS (RTOS) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 9, in one embodiment, the baseband circuitry 710 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate Long Term Evolution (LTE) protocol entities and/or Fifth Generation (5G)/New Radio (NR) protocol entities when the RFEMs 715 are cellular radiofrequency communication system, such as mmW communication circuitry or some other suitable cellular communication circuitry. In the first example, the protocol processing circuitry would operate medium access control (MAC), radio link control (RLC), packet data convergence protocol (PDCP), service data adaptation protocol (SDAP), radio resource control (RRC), and non-access stratum (NAS) functions. In a second example, the protocol processing circuitry may operate one or more IEEE-based protocols when the RFEMs 715 are WiFi communication system. In the second example, the protocol processing circuitry would operate WiFi MAC and logical link control (LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 710 and/or RFEMs 715. The baseband circuitry 710 may also support radio communications for more than one wireless protocol.

Continuing with the aforementioned embodiment, the baseband circuitry 710 includes individual processing device(s) to implement PHY including hybrid automatic repeat request (HARD) functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions, etc. The modulation/demodulation functionality may include Fast-Fourier Transform (FFT), precoding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 750 may include one or more user interfaces designed to enable user interaction with the system 700 or peripheral component interfaces designed to enable peripheral component interaction with the system 700. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 715 may comprise a mmW RFEM and one or more sub-mmW radio frequency integrated circuits (RFICs). In some implementations, the one or more sub-mmW RFICs may be physically separated from the mmW RFEM. The RFICs may include connections to one or more antennas or antenna arrays, and the RFEM may be connected to multiple antennas. In alternative implementations, both mmWave and sub-mmW radio functions may be implemented in the same physical RFEM 715, which incorporates both mmWave antennas and sub-mmW. The antenna array comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 720 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 720 may be implemented as one or more of solder down packaged integrated circuits, socketed memory modules and plug-in memory cards. The memory circuitry 720 may be configured to store the gain table, pre-determined one or more sets of bias control vectors, as depicted in FIGS. 2-5 in the form of software, firmware, or hardware commands to implement the techniques described herein. The computational logic or modules corresponding to the gain calibration 200 may be developed using a suitable programming language or development tools, such as any programming language or development tool discussed herein. The computational logic may be employed to store working copies and/or permanent copies of programming instructions for the operation of various components of appliance infrastructure equipment 700, an operating system of infrastructure equipment 700, one or more applications, and/or for carrying out the embodiments discussed herein (such as one or more operations of depicted by FIGS. 2-5 and/or the like). The computational logic may be stored or loaded into memory circuitry 720 as instructions for execution by the processors of the application circuitry 705 to provide or perform the functions described herein. The various elements may be implemented by assembler instructions supported by processors of the application circuitry 705 or high-level languages that may be compiled into such instructions. The permanent copy of the programming instructions may be placed into persistent storage devices of memory circuitry 720 in the factory during manufacture, or in the field through, for example, a distribution medium (not shown), through a communication interface (e.g., from a distribution server), and/or over-the-air (OTA).

The PMIC 725 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 730 may provide for electrical power drawn from a network cable to provide both power supply and data connectivity to the infrastructure equipment 700 using a single cable.

The network controller circuitry 735 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 700 via network interface connector 740 using a physical connection, which may be electrical (commonly referred to as a "copper interconnect"), optical, or wireless. The network controller circuitry 735 may include one or more dedicated processors and/or FPGAs to communicate using one or more of the aforementioned protocols. In some implementations, the network controller circuitry 735 may include multiple controllers to provide connectivity to other networks using the same or different protocols. In various embodiments, the network controller circuitry 735 enables communication with associated equipment and/or with a backend system, which may take place via a suitable gateway device.

The positioning circuitry 745 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 745 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 745 may include a Micro-Technology for Positioning, Navigation, and Timing (Micro-PNT) IC that uses a master timing clock to perform position tracking/estimation without GNSS assistance. The positioning circuitry 745 may also be part of, or interact with, the baseband circuitry 710 and/or RFEMs 715 to communicate with the nodes and components of the positioning network. The positioning circuitry 745 may also provide position data and/or time data to the application circuitry 705, which may use the data to synchronize operations with various other infrastructure equipment, or the like.

The components shown by FIG. 9 may communicate with one another using interface circuitry, which may include any number of bus and/or interconnect (IX) technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

EXAMPLES

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes an apparatus for transmitting or receiving signals, the apparatus comprising: a Radio Frequency (RF) Front-End (FE) module; gain control circuitry arranged to select a bias control vector from a set of bias control vectors associated with respective gain values, based at least in part on a target gain of the RFFE module; and configuration circuitry, communicatively coupled with the RFFE module and the gain control circuitry, arranged to configure individual active RF stages of the RFFE module with the selected bias control vector; wherein, the bias control vector includes a set of control values, and each control value of the set of control values is to configure a corresponding active RF stage of the active RF stages of the RFFE module, and the target gain corresponds to a gain of the RFFE module that the RFFE module is determined to provide with respect to a baseline RFFE temperature and a baseline RFFE operating frequency.

Example 2 includes the apparatus of example 1 and/or some other example(s) herein, wherein the RFFE module includes one or more RF transmitter chains and one or more RF receiver chains, and the active RF stages include mixers and amplifiers.

Example 3 includes the apparatus of example 1 and/or some other example(s) herein, wherein the set of bias control vectors includes a plurality of bias control vectors, each bias control vector is to configure the RFFE module to provide a gain of the RFFE module at an RFFE temperature and an RFFE operating frequency, further wherein, the each bias control vector is determined based at least in part on Noise Figure (NF) and linearity of the RFFE module.

Example 4 includes the apparatus of example 1 and/or some other example(s) herein, wherein to determine the bias control vector, the gain control circuitry is to: determine the target gain of the RFFE module; determine a measured gain of the RFFE module based on an open-loop RF gain measurement; determine a gain error between the measured gain and the target gain; determine a configured gain to compensate the gain error based on the gain error and the target gain; and select, based on the configured gain, the bias control vector from the set of bias control vectors.

Example 4.1 includes the apparatus of example 1 and/or some other example(s) herein, wherein to determine the bias control vector, the gain control circuitry is to: determine the target gain of the RFFE module; measure an actual gain of the RFFE module based on an open-loop RF gain measurement; determine a gain error based on the measured actual gain and the target gain; determine a configured gain to compensate the gain error based on the gain error and the target gain; and select, based on the configured gain, the bias control vector from the set of bias control vectors.

Example 4.2 includes the apparatus of example 4.1 and/or some other example(s) herein, wherein to measure an actual gain of the RFFE module based on an open-loop RF gain measurement is to measure an output power level of a transmit RF signal by a first power detector; measure an input power level of a transmit baseband signal by a second power detector; and derive the measured gain based on the measured input power level and the measured output power level.

Example 4.3 includes the apparatus of example 4.2 and/or some other example(s) herein, wherein the RFFE module operates with respect to the one or more RF transmitter chains.

Example 4.4 includes the apparatus of example 4.1 and/or some other example(s) herein, wherein to measure an actual gain of the RFFE module based on an open-loop RF gain measurement is to measure an output power level of a processed baseband signal by a first power detector; measure an input power level of a received RF signal by a second power detector; and derive the measured gain based on the measured input power level and the measured output power level.

Example 4.5 includes the apparatus of example 4.4 and/or some other example(s) herein, wherein the RFFE module operates with respect to the one or more RF receiver chains.

Example 5 includes the apparatus of example 1 and/or some other example(s) herein, wherein to determine the bias control vector, the gain control circuitry is to determine the target gain of the RFFE module; determine a measured RFFE temperature based on a thermal measurement of the RFFE module; determine a first shift gain based on the measured RFFE temperature according to a gain-shift table with respect to temperature; determine a configured gain based on the target gain and the first shift gain; and select, based on the configured gain, the bias control vector from the set of bias control vectors.

Example 5.1 includes the apparatus of example 5 and/or some other example(s) herein, wherein the gain-shift table with respect to temperature includes a set of gain shift values corresponding to a set of temperature changes.

Example 5.2 includes the apparatus of example 5 and/or some other example(s) herein, wherein the gain-shift table is pre-determined or generated by RF gain measurements corresponding to temperature changes, further wherein, the RF gain measurements is as described in Example 4.2.

Example 6 includes the apparatus of example 5 and/or some other example(s) herein, wherein to determine the first shift gain, the gain control circuitry is to determine a temperature shift between the measured RFFE temperature and the base RFFE temperature, wherein the baseline RFFE temperature is a room temperature; and determine the first gain shift based on the temperature shift according to the gain-shift table with respect to temperature.

Example 7 includes the apparatus of example 5 and/or some other example(s) herein, wherein the thermal measurement is to measure the RFFE module at one or more locations of the RFFE module via one or more thermal sensors.

Example 8 includes the apparatus of example 5 and/or some other example(s) herein, wherein the gain control circuitry is further to determine an RFFE operating frequency based on an operation of the RFFE module; determine a second shift gain based on the determined RFFE operating frequency according to a gain-shift table with respect to frequency; determine the configured gain based on the target gain and a sum of the first shift gain and the second shift gain.

Example 9 includes the apparatus of example 8 and/or some other example(s) herein, wherein to determine the second shift gain, the gain control circuitry is to determine a frequency shift between the RFFE operating frequency and the base RFFE operating frequency, wherein the base RFFE operating frequency is pre-determined; and determine the second gain shift based on the frequency shift according to the gain-shift table with respect to frequency.

Example 10 includes the apparatus of example 8 and/or some other example(s) herein, wherein the gain-shift table and frequency-shift table are predetermined based on RFFE module behaviors with respect to RFFE temperatures and operating frequencies.

Example 11 includes the apparatus of example 1 and/or some other example(s) herein, wherein the target gain of the RFFE module corresponding to a gain value that is in a range from a minimum gain value to a maximum gain value, and the range includes a plurality of gain values with a constant increment from the minimum gain value to the maximum gain value.

Example 12 includes the apparatus of example 1 and/or some other example(s) herein, wherein the gain control circuitry is further to characterize the each set of bias control vector for the corresponding RF chain.

Example 13 includes the apparatus of examples 10-11 and/or some other example(s) herein, wherein the apparatus is a millimeter wave (mmW) transceiver for vehicular radar sensing, and the RFFE module is configured to transmit or receive RF signals in mmW.

Example 14 includes an apparatus for characterizing an RF transmitter or receiver, the apparatus comprising: gain control circuitry arranged to determine a bias control vector based on a target gain of one RF transmitter or receiver of the transceiver, according to a gain table of a plurality of RF gain values of the RF transmitter or receiver associated with respective bias control vectors; determine a measured actual gain of the RF transmitter or receiver based on a measurement of the configured RF transmitter or receiver; and update the gain table based on the actual gain; and configuration circuitry arranged to configure active RF components of the RF transmitter or receiver with the bias control vector, wherein the bias control vector includes a set of control values, each control value is to configure a corresponding active RF component of the active RF components of the at least one RF transmitter or receiver.

Example 15 includes the apparatus of example 14 and/or some other example(s) herein, wherein to update the gain table, the gain control circuitry is to update the target gain value with the actual gain.

Example 16 includes the apparatus of example 14 and/or some other example(s) herein, wherein the determining, configuring, measuring and updating are locally performed during power on or reset of the radar system.

Example 17 includes a computer-readable media, including instructions, to cause an RF transmitter or receiver to: receive respective measured RF-chain temperatures of respective RF chains of a RF transceiver based on respective thermal sensing of the RF chains; determine respective shift gains of the respective RF chains from respective target gains of the RF chains, based on the respective measured RF-chain temperatures according to respective shift gain and temperature relations; determine respective configured gains of the RF chains, based on the respective target gains and the respective shift gains; select, based on the respective configured gains, respective bias control vectors from respective sets of bias control vectors; and configure the RF chains with the respective selected bias control vectors; wherein, each set of bias control vectors of the respective sets of bias control vectors is characterized for a corresponding RF chain of the respective RF chains, and each bias control vector of the each set of bias control vectors includes a set of control values and the set of control values are to configure the corresponding RF chain to provide a gain with respect to a base temperature.

Example 18 includes the CRM of example 17 and/or some other example(s) herein, wherein the RF chains include a plurality of RF transmitter chains or RF receiver chains, and the active RF stages include mixers and amplifiers.

Example 19 includes the CRM of example 17 and/or some other example(s) herein, wherein execution of the instructions is further to cause the RF chains to: determine a target gain of the RF chain; measure a set of actual gains of the RF chain corresponding to a set of RF-chain temperatures; measure the set of RF-chain temperatures; determine the shift gain and temperature relation based on the set of actual gains and the set of RF-chain temperatures; and configure an RF chain with a bias control vector corresponding to the target gain.

Example 20 includes the CRM of examples 17 and/or some other example(s) herein, wherein execution of the instructions is further to cause the RF chains to characterize the each set of bias control vectors for the corresponding RF chain.

Example 21 includes a method for operating an RF transceiver, the method comprising: selecting a bias control vector from a set of bias control vectors associated with respective gain values, based at least in part on a target gain of the RFFE module; and configuring individual active RF stages of the RFFE module with the selected bias control vector; wherein, the bias control vector includes a set of control values and each control value of the set of control values is to configure a corresponding active RF stage of the active RF stages of the RFFE module, and the target gain corresponds to a gain of the RFFE module that the RFFE module is determined to provide with respect to a baseline RFFE temperature and a baseline RFFE operating frequency.

Example 22 includes the method of example 21 and/or some other example(s) herein, wherein the RFFE module includes one or more RF transmitter chains and one or more RF receiver chains, and the active RF stages include mixers and amplifiers.

Example 23 includes the method of example 21 and/or some other example(s) herein, wherein the set of bias control vectors includes a plurality of bias control vectors, each bias control vector is to configure the RFFE module to provide a gain of the RFFE module at an RFFE temperature and an RFFE operating frequency, further wherein, the each bias control vector is determined based at least in part on Noise Figure (NF) and linearity of the RFFE module.

Example 24 includes the method s of example 21 and/or some other example(s) herein, wherein the determining the bias control vector is to determine the target gain of the RFFE module; determine a measured gain of the RFFE module based on an open-loop RF gain measurement; determine a gain error between the measured gain and the target gain; determine a configured gain to compensated the gain error based on the gain error and the target gain; and select, based on the configured gain, the bias control vector from the set of bias control vectors.

Example 24.1 includes the method of example 21 and/or some other example(s) herein, wherein the determining the bias control vector is to determine the target gain of the RFFE module; measure an actual gain of the RFFE module based on an open-loop RF gain measurement; determine a gain error based on the measured actual gain and the target gain; determine a configured gain to compensated the gain error based on the gain error and the target gain; and select, based on the configured gain, the bias control vector from the set of bias control vectors.

Example 24.2 includes the method of example 24.1 and/or some other example(s) herein, wherein measuring an actual gain of the RFFE module based on an open-loop RF gain measurement is to measure the actual gain is to: measure an output power level of a transmit RF signal by a first power detector; measure an input power level of a transmit baseband signal by a second power detector; and derive the measured gain based on the measured input power level and the measured output power level.

Example 24.3 includes the method of example 24.2 and/or some other example(s) herein, wherein the RFFE module operates with respect to the one or more RF transmitter chains.

Example 24.4 includes the method of example 24.1 and/or some other example(s) herein, wherein the measuring an actual gain of the RFFE module based on an open-loop RF gain measurement is to measure the actual gain is to: measure an output power level of a processed baseband signal by a first power detector; measure an input power level of a received RF signal by a second power detector; and derive the measured gain based on the measured input power level and the measured output power level.

Example 24.5 includes the method of example 24.4 and/or some other example(s) herein, wherein the RFFE module operates with respect to the one or more RF receiver chains.

Example 25 includes the method of example 21 and/or some other example(s) herein, wherein determining the bias control vector is to determine the target gain of the RFFE module; determine a measured RFFE temperature based on a thermal measurement of the RFFE module; determine a first shift gain based on the measured RFFE temperature according to a gain-shift table with respect to temperature; determine a configured gain based on the target gain and the first shift gain; and select, based on the configured gain, the bias control vector from the set of bias control vectors.

Example 25.1 includes the method of example 25 and/or some other example(s) herein, wherein the gain-shift table with respect to temperature includes a set of gain shift values corresponding to a set of temperature changes.

Example 25.2 includes the method of example 25 and/or some other example(s) herein, wherein the gain-shift table is pre-determined or generated by RF gain measurements corresponding to temperature changes, further wherein the RF gain measurements is as described in Example 24.2.

Example 26 includes the method of example 25 and/or some other example(s) herein, wherein determining the first shift gain, the gain control circuitry is to determine a temperature shift between the measured RFFE temperature and the base RFFE temperature, wherein the baseline RFFE temperature is a room temperature; and determine the first gain shift based on the temperature shift according to the gain-shift table with respect to temperature.

Example 27 includes the method of example 25 and/or some other example(s) herein, wherein the thermal measurement is to measure the RFFE module at one or more locations of the RFFE module via one or more thermal sensors.

Example 28 includes the method of example 25 and/or some other example(s) herein, further comprising determining an RFFE operating frequency based on an operation of the RFFE module; determine a second shift gain based on the determined RFFE operating frequency according to a gain-shift table with respect to frequency; and determining the configured gain based on the target gain and a sum of the first shift gain and the second shift gain.

Example 29 includes the method of example 28 and/or some other example(s) herein, wherein determining the second shift gain is to determine a frequency shift between the RFFE operating frequency and the base RFFE operating frequency, wherein the base RFFE operating frequency is pre-determined; and determine the second gain shift based on the frequency shift according to the gain-shift table with respect to frequency.

Example 30 includes the method of example 28 and/or some other example(s) herein, wherein the gain-shift table and frequency-shift table are predetermined based on RFFE module behaviors with respect to RFFE temperatures and operating frequencies.

Example 31 includes the method of example 21 and/or some other example(s) herein, wherein the target gain of the RFFE module corresponding to a gain value that is in a range from a minimum gain value to a maximum gain value, and the range is discrete with a constant increment from the minimum gain value to the maximum gain value.

Example 32 includes the method of example 21 and/or some other example(s) herein, wherein the gain control circuitry is further to characterize the each set of bias control vector for the corresponding RF chain.

Example 33 includes the method of examples 20-32 and/or some other example(s) herein, wherein the apparatus is a millimeter wave (mmW) transceiver for vehicular radar sensing, and the RFFE module is configured to transmit or receive RF signals in mmW.

Example 34 includes an method for characterizing an RF transmitter or receiver, comprising: determining a bias control vector based on a target gain of one RF transmitter or receiver of the transceiver, according to a gain table of a plurality of RF gain values of the RF transmitter or receiver associated with respective bias control vectors; determining a measured actual gain of the RF transmitter or receiver based on a measurement of the configured RF transmitter or receiver; and updating the gain table based on the actual gain; and configuration circuitry arranged to configure active RF components of the RF transmitter or receiver with the bias control vector, wherein the bias control vector include a set of control values, each control value is to configure a corresponding active RF component of the active RF components of the at least one RF transmitter or receiver.

Example 35 includes the method of example 34 and/or some other example(s) herein, wherein the updating the gain table is to update the target gain value with the actual gain.

Example 36 includes the method of example 34 and/or some other example(s) herein, wherein the determining, configuring, measuring and updating are locally performed during power on or reset of the radar system.

Example 37 may include an apparatus comprising means to perform one or more elements of a method described in or related to any of examples 1-36, or any other method or process described in the present disclosure.

Example 38 may include one or more non-transitory computer-readable media comprising instructions to cause an electronic device, upon execution of the instructions by one or more processors of the electronic device, to perform one or more elements of a method described in or related to any of examples 1-36, or any other method or process described in the present disclosure.

Example 39 may include an apparatus comprising logic, modules, or circuitry to perform one or more elements of a method described in or related to any of examples 1-36, or any other method or process described in the present disclosure.

Example 40 includes a method, technique, or process as described in or related to any of examples 1-36, or portions or parts thereof, or otherwise described in the present disclosure.

Example 41 includes an apparatus comprising: one or more processors and one or more computer-readable media comprising instructions that, when executed by the one or more processors, cause the one or more processors to perform the method, techniques, or process as described in or related to any of examples 1-36, or portions thereof, or otherwise described in the present disclosure. The one or more computer-readable media may be one transitory or non-transitory computer-readable media.

Example 42 includes at least one transitory or non-transitory computer-readable storage medium comprising data, wherein the data is to create, manufacture, or otherwise produce instructions, wherein execution of the instructions is to cause a computing device or computing system to perform the method, techniques, or process as described in or related to any of examples 1-36, or portions thereof, or otherwise described in the present disclosure.

Example 43 includes a signal as described in or related to any of examples 1-36, or portions or parts thereof, or otherwise described in the present disclosure.

Example 44 includes a signal in a wireless network as shown and described in the present disclosure, or otherwise described in the present disclosure.

Example 45 includes a method of communicating in a wireless network as shown and described in the present disclosure.

Example 46 includes a system for providing wireless communication as shown and described in the present disclosure.

Example 47 includes a device for providing wireless communication as shown and described in the present disclosure.

Example 48 includes a packet, frame, segment, protocol data unit (PDU), or message as described in or related to any of examples 1-36, or portions or parts thereof, or otherwise described in the present disclosure.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

It will be understood that each block of the flowchart illustrations and/or block diagrams, and combinations of blocks in the flowchart illustrations and/or block diagrams, may be implemented in hardware, firmware, software, or any combination thereof. The disclosed embodiments may be implemented as a computer process, a computing system, or as an article of manufacture such as a computer program product of computer readable media. The computer program product may include one or more transitory or non-transitory machine-readable (e.g., computer-readable) media comprising encoded computer program instructions for executing the computer process, which is readable and/or executable by one or more processors of a computer system. The machine-readable storage medium may be embodied as any storage device, mechanism, or other physical structure for storing or transmitting information in a form readable by a machine (e.g., a volatile or non-volatile memory, a media disc, or other media device). These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

As used herein, the term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

As used herein, the term "device" may refer to a physical entity embedded inside, or attached to, another physical entity in its vicinity, with capabilities to convey digital information from or to that physical entity.

As used herein, the term "element" may refer to a unit that is indivisible at a given level of abstraction and has a clearly defined boundary, wherein an element may be any type of entity.

As used herein, the term "component" may refer to a physical RF component, device, Integrated Circuit (IC), or circuitry, to perform a function.

As used herein, the term "architecture" may refer to a fundamental organization of a system embodied in its components, their relationships to one another, and to an environment, as well as to the principles guiding its design and evolution. As used herein, the term "appliance," "computer appliance," or the like, refers to a discrete hardware device with integrated program code (e.g., software or firmware) that is specifically or specially designed to provide a specific computing resource. A "virtual appliance" is a virtual machine image to be implemented by a hypervisor-equipped device that virtualizes or emulates a computer appliance or otherwise is dedicated to provide a specific computing resource.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiments were chosen and described in order to best explain the principles of the disclosure and the practical application, and to enable others of ordinary skill in the art to understand the disclosure for embodiments with various modifications as are suited to the particular use contemplated.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An apparatus for transmitting or receiving signals, comprising:
    a Radio Frequency (RF) Front-End (FE) module;
    gain control circuitry, communicatively coupled with the RFFE module, arranged to select a bias control vector from a set of bias control vectors associated with respective gain values, based at least in part on a target gain of the RFFE module; and
    configuration circuitry, communicatively coupled with the RFFE module and the gain control circuitry, arranged to configure individual active RF stages of the RFFE module with the selected bias control vector;
    wherein,
    the bias control vector includes a set of control values and each control value of the set of control values is to configure a corresponding active RF stage of the active RF stages of the RFFE module, and
    the target gain corresponds to a gain of the RFFE module that the RFFE module is determined to provide with respect to a baseline RFFE temperature and a baseline RFFE operating frequency.

2. The apparatus of claim 1, wherein the RFFE module includes one or more RF transmitter chains and one or more RF receiver chains, and the active RF stages include mixers and amplifiers.

3. The apparatus of claim 1, wherein the set of bias control vectors includes a plurality of bias control vectors, each bias control vector is to configure the RFFE module to provide a gain of the RFFE module at an RFFE temperature and an RFFE operating frequency, further wherein, the each bias control vector is determined based at least in part on Noise Figure (NF) and linearity of the RFFE module.

4. The apparatus of claim 1, wherein to determine the bias control vector, the gain control circuitry is to:
    determine the target gain of the RFFE module;
    determine a measured gain of the RFFE module based on an open-loop RF gain measurement;
    determine a gain error between the measured gain and the target gain;
    determine a configured gain to compensate the gain error based on the gain error and the target gain; and
    select, based on the configured gain, the bias control vector from the set of bias control vectors.

5. The apparatus of claim 1, wherein to determine the bias control vector, the gain control circuitry is to:
    determine the target gain of the RFFE module;
    determine a measured RFFE temperature based on a thermal measurement of the RFFE module;
    determine a first shift gain based on the measured RFFE temperature according to a gain-shift table with respect to temperature;
    determine a configured gain based on the target gain and the first shift gain; and
    select, based on the configured gain, the bias control vector from the set of bias control vectors.

6. The apparatus of claim 5, wherein to determine the first shift gain, the gain control circuitry is to:
    determine a temperature shift between the measured RFFE temperature and the baseline RFFE temperature, wherein the baseline RFFE temperature is a room temperature; and
    determine the first shift gain based on the temperature shift according to the gain-shift table with respect to temperature.

7. The apparatus of claim 5, wherein the thermal measurement is to measure the RFFE module at one or more locations of the RFFE module via one or more thermal sensors.

8. The apparatus of claim 5, wherein the gain control circuitry is further to:
    determine an RFFE operating frequency based on an operation of the RFFE module;
    determine a second shift gain based on the determined RFFE operating frequency according to a gain-shift table with respect to frequency; and
    determine the configured gain based on the target gain and a sum of the first shift gain and the second shift gain.

9. The apparatus of claim 8, wherein to determine the second shift gain, the gain control circuitry is to:
    determine a frequency shift between the RFFE operating frequency and the base RFFE operating frequency, wherein the base RFFE operating frequency is predetermined; and
    determine the second shift gain based on the frequency shift according to the gain-shift table with respect to frequency.

10. The apparatus of claim 8, wherein the gain-shift table and frequency-shift table are predetermined based on RFFE module behaviors with respect to RFFE temperatures and operating frequencies.

11. The apparatus of claim 1, wherein the target gain of the RFFE module corresponds to a gain value that is in a range from a minimum gain value to a maximum gain value, and the range is discrete with a constant increment from the minimum gain value to the maximum gain value.

12. The apparatus of claim 1, wherein the apparatus is a millimeter wave (mmW) transceiver for vehicular radar sensing, and the RFFE module is configured to transmit or receive RF signals in mmW.

13. An apparatus for sensing with Radio Frequency (RF), comprising:
gain control circuitry arranged to:
receive respective measured RF-chain temperatures of respective RF chains of a RF transceiver based on respective thermal sensing of the RF chains,
determine respective shift gains of the respective RF chains from respective target gains of the RF chains, based on the respective measured RF-chain temperatures according to respective shift gain and temperature relations,
determine respective configured gains of the RF chains, based on the respective target gains and the respective shift gains, and
select, based on the respective configured gains, respective bias control vectors from respective sets of bias control vectors; and
configuration circuitry, communicatively coupled with the gain control circuitry and the respective RF chains, arranged to configure the RF chains with the respective selected bias control vectors;
wherein,
each set of bias control vectors of the respective sets of bias control vectors is characterized for a corresponding RF chain of the respective RF chains, and
each bias control vector of the each set of bias control vectors includes a set of control values and the set of control values are to configure the corresponding RF chain so that the corresponding RF chain is to provide a gain with respect to a base temperature.

14. The apparatus of claim 13, wherein the RF chains include a plurality of RF transmitter chains or RF receiver chains, and active RF stages having mixers and amplifiers.

15. The apparatus of claim 13, wherein the respective shift gain and temperature relation is pre-determined, and further wherein to determine each shift gain and temperature relation:
the gain control circuitry is arranged to:
determine a target gain of the RF chain,
measure a set of actual gains of the RF chain corresponding to a set of RF-chain temperatures,
measure the set of RF-chain temperatures, and
determine the shift gain and temperature relation based on the set of actual gains and the set of RF-chain temperatures; and
the configuration circuitry is arranged to configure an RF chain with a bias control vector corresponding to the target gain.

16. The apparatus of claim 13, wherein to measure the set of actual gains of the RF chain, the gain control circuitry is to measure the set of actual gains of the RF chain in an open-loop RF chain measurement.

17. The apparatus of claim 13, wherein the gain control circuitry is further to characterize the each set of bias control vectors for the corresponding RF chain.

18. The apparatus of claim 13, wherein the apparatus is a radar system of an autonomous driving vehicle, and further comprises the RF transceiver.

19. A method for operating a transceiver, comprising:
determining or causing to determine a bias control vector based on a target gain of at least one Radio Frequency (RF) transmitter or receiver of the transceiver, according to a gain table of a plurality of RF gain values of the at least one RF transmitter or receiver associated with respective bias control vectors;
configuring or causing to determine active RF components of the at least one RF transmitter or receiver with the bias control vector, wherein the bias control vector includes a set of control values, and each control value is to configure a corresponding active RF component of the active RF components of the at least one RF transmitter or receiver;
measuring or causing to measure an actual gain of the at least one RF transmitter or receiver based on a measurement of the configured at least one RF transmitter or receiver; and
updating or causing to update the gain table based on the actual gain.

20. The method of claim 19, wherein each gain value of the plurality of gain values corresponds to a gain that the at least one RF transmitter or receiver is to be configured to provide.

21. The method of claim 20, wherein updating the gain table is to update a target gain value with the actual gain.

22. The method of claim 19, wherein the transceiver is a transceiver of a radar system of an autonomous vehicles, and wherein the determining, configuring, measuring and updating are locally performed during power on or reset of the radar system.

* * * * *